United States Patent Office 2,971,036
Patented Feb. 7, 1961

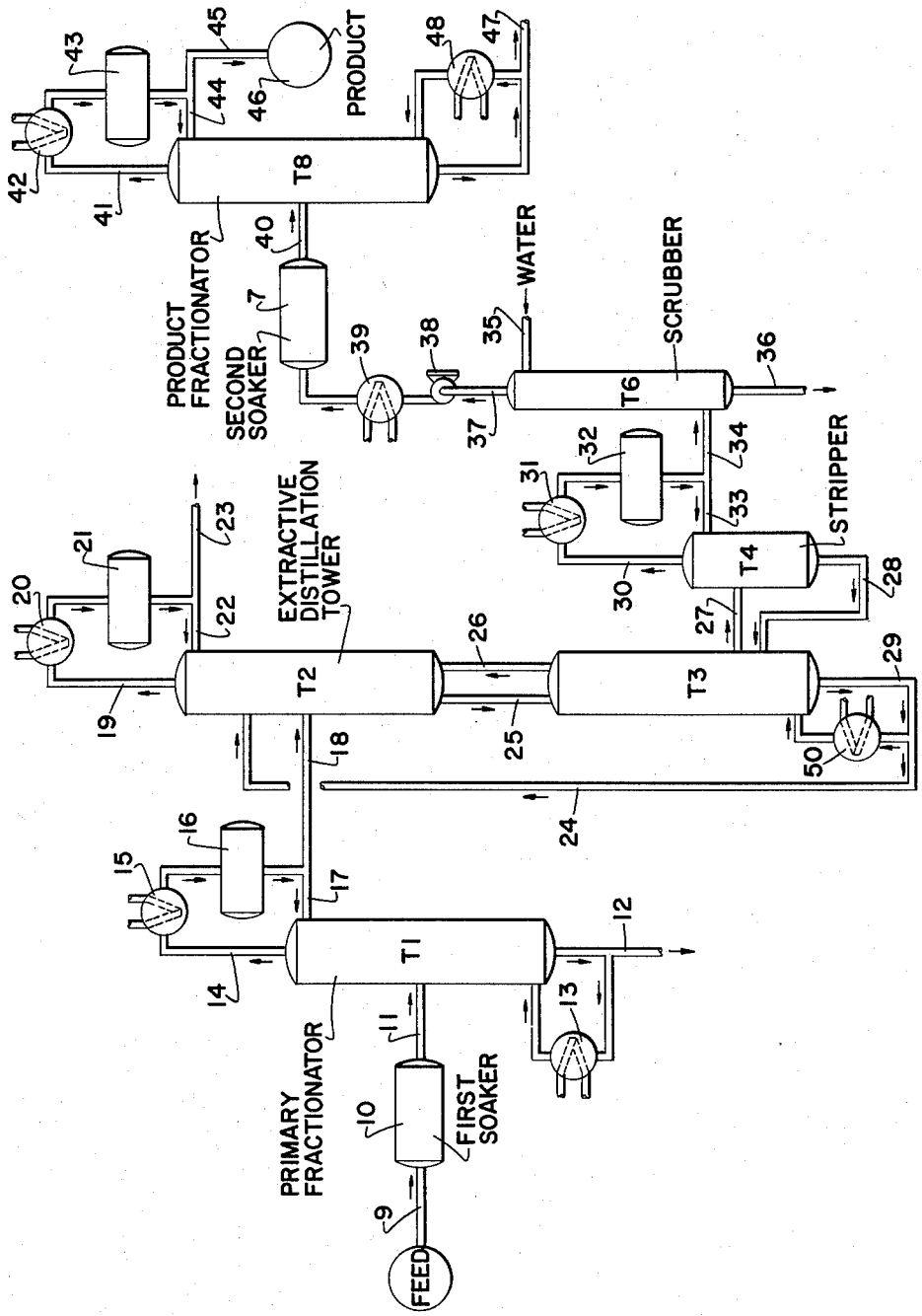

2,971,036

RECOVERY OF ISOPRENE BY FRACTIONATION AND EXTRACTIVE DISTILLATION

Jimmy Donald James, Baton Rouge, La., assignor to Esso Research and Engineering Company, a corporation of Delaware Filed Sept. 17, 1958, Ser. No. 761,504

1 Claim. (Cl. 260—681.5)

This invention is concerned with a process of preparing an isoprene-rich fraction for extractive distillation, in which an isoprene concentrate is separated with a solvent mainly from mono-olefins having 5 carbon atoms per molecule, and a final fractional distillation of the isoprene concentrate is carried out to obtain an isoprene product of satisfactory purity.

The objects of this invention are attained by having relatively high amounts of cyclopentadiene present in the isoprene cut prepared for the extractive distillation, with the isoprene which is extracted and then interposing a selective cyclopentadiene dimerizing step to facilitate the final fractional distillation of the isoprene product.

Although the prior art describes systems employed in applicant's invention, with modifications that will be described in fuller detail, it will be noted that the prior art systems pertaining to the recovery of isoprene involved difficulties of handling streams containing substantial amounts of cyclopentadiene and, therefore, in the past great pains were taken to eliminate the cyclopentadiene from the isoprene prior to the extractive distillation. Typical of such prior art is U.S. Patent 2,426,705 of Patterson et al.; U.S. Patent 2,372,941 of Evans et al.; U.S. Patent 2,379,696 of Evans; and U.S. Patent 2,371,908 of Morris et al. These and other patents describe various suitable solvents for the extractive distillation.

Preferably, aqueous acetone and aqueous acetonitrile containing 5 to 15 weight percent water are used as suitable solvents in separating isoprene with cyclopentadiene from the mono-olefins in the extractive distillation.

Briefly, the process steps involved in the recovery of isoprene are the following:

(1) Heat soaking a $C_4$ to $C_9$ fraction (a mixture containing about 45 wt. percent or more of olefins and diolefins having 5 carbon atoms per molecule) to dimerize cyclopentadiene.

(2) Superfractionation of the $C_4$–$C_9$ fraction to obtain a narrow isoprene-rich distillate containing very little of the hydrocarbons having boiling points above 160° F. and partially freed of cyclopentadiene.

(3) Extractively distilling the isoprene-rich fractional distillate with the solvent which preferentially extracts the diolefins.

(4) Stripping of the diolefins from the extract.

(5) Fractionation of the diolefins stripped from the extract to recover a high purity isoprene distillate product.

In the step of heat soaking the initial $C_4$–$C_9$ fraction, this operation can be carried out more or less extensively depending upon how much of the cyclopentadiene is to be allowed to remain with the isoprene. As the removal of the cyclopentadiene is made more complete, there tends to be more of a loss of other diolefins by polymerization and interpolymerization.

The second step, which is the superfractionation, is carried out in what may be called a primary fractionator. While it is easy to distill the isoprene away from piperylenes, cyclopentene and cyclopentane in the primary fractionator, there have been difficulties in separating the isoprene from close- and higher-boiling substances, such as 2-methyl butene-2 (trimethylethylene) and cyclopentadiene.

The highly complex mixtures of hydrocarbons including isoprene are obtained in large volume in high-temperature steam-cracking units. Hitherto, it was considered necessary to carry out a primary fractionation of the isoprene-containing fraction in a precise manner so as to leave substantially all cyclopentadiene in the residue. To obtain such precise fractionation, high reflux ratios have to be used and there is a tendency toward prolonged heating which results in polymerization of the more unsaturated compounds. Thus, the more precise primary fractionation leads to a certain loss of isoprene from the distillate which is to be subjected to the extractive distillation.

In accordance with the present invention, it has been found advantageous to have a substantial amount of the cyclopentadiene distill overhead with the isoprene, thus minimizing dimerization and increasing the capacity of the primary fractionator. The primary fractionator can be controlled according to the amount of the cyclopentadiene taken overhead with the isoprene. For example, the primary fractionator can be operated to have the overhead product contain more than 1 weight percent cyclopentadiene, preferably 1.2 to 2.0 weight percent cyclopentadiene. This increased amount of cyclopentadiene which stays with the isoprene in the feed to the extractive distillation acts satisfactorily toward the recovery of the isoprene in the extract and the concentrate therefrom.

After the isoprene and cyclopentadiene are stripped from the extract to obtain the isoprene-rich concentrate that is to be passed ultimately on to the product fractionator, the operation of the product fractionator is greatly facilitated by dimerizing the cyclopentadiene that is present in the isoprene concentrate before it is fed into the product fractionator.

To illustrate the invention, a description of the principal processing steps will be presented with reference to the accompanying drawing which shows a schematic flow plan. The flow plan indicates the steps and suitable flow of materials used in a preferred embodiment of the invention.

In the flow plan, the principal fractionating equipment includes the primary fractionator T1, the extractive distillation towers T2 and T3, the isoprene concentrate stripping tower T4, water scrubbing tower T6, and product fractionator tower T8. The cyclopentadiene dimerizing soaking tank 7 is located so as to treat the concentrate stream passing from scrubbing tower T6 to tower T8.

A feed stock containing olefins and diolefins having 4 to 9 carbon atoms per molecule is supplied from a steam-cracking fractionator by line 9 to a primary soaking zone vessel 10 for dimerizing cyclodienes therein. This soaking is controlled at a temperature in the range of 180° to 240° F. under pressure for a period of 1 to 30 hours to dimerize cyclodienes selectively with a minimum co-polymerization of the isoprene by leaving some of the cyclopentadiene unreacted.

The soaked feed stock containing the cyclodiene dimers with olefins and diolefins having 4 to 9 carbon atoms per molecule from which isoprene is to be recovered is passed by line 11 to the primary fractionator T1. Fractionator T1 may be of the usual type containing bubble plates or the like. It may be equipped with a bottom drawoff 12, a reboiler 13, an overhead line 14, condenser 15, reflux drum 16 and product transfer line 18. In a normal operation about 50 plates are present in T1. The overhead product, which is not refluxed, is transferred by line 18 into the extractive distillation tower T2. The bottoms of T1, containing piperylene and higher-boiling hydrocarbons, are withdrawn from the system through line 12. The composition of this bottoms will vary with the operation of T1 so that the bottoms may contain varying amounts of trimethylethylene and cyclopentadiene. As the content of trimethylethylene and cyclopentadiene in the bottoms is increased, there is an increase of isoprene which remains in this residual bottoms. The bottoms will also contain polymers and dimers to an extent, depending on the extent of heating. The degree of separation in T1 is controlled by the heat supplied from the reboiler, the ratio of reflux supplied through line 17 and the number of plates.

In accordance with the present invention, a large proportion of the isoprene is taken overhead through line 14 with a substantial amount of cyclopentadiene and with lower-boiling olefins and paraffins.

The overhead product from T1 passed by line 18 into T2 undergoes a fractional distillation in T2 in the presence of the selective solvent which flows down through the tower countercurrent to the vapors. Tower T2 has the usual fractionating tower design. It is equipped with overhead line 19, condenser 20, reflux drum 21, reflux line 22 and overhead raffinate withdrawal line 23. In tower T2 the vapors of the mono-olefins and paraffins flow upwardly and are withdrawn through overhead line 19. The solvent, such as aqueous acetone or acetonitrile, enters the upper part of T2 by line 24. Bottoms product flows from T2 through line 25 into what may be considered a stripping section of the extractive distillation contained within T3. Vapors from the upper part of T3 are passed into the bottom part of T2 through line 26. These vapors contain mono-olefins together with some vaporized isoprene and cyclopentadiene. These vapors act in the manner of a reflux to displace mono-olefins in the extract flowing toward the bottom of T2. Vapors released from the extract solution at a lower part of T3 are withdrawn through line 27 to stripping tower T4 in which isoprene, cyclopentadiene and other higher-boiling components are separated from the extract solution vapors. Part of the solvent and hydrocarbons which are condensed in T4 are withdrawn through a bottom line 28 for return to T3. The tower T3 has a withdrawal line 29 for the lean solvent and a reboiler 50. The lean solvent may be recycled from line 29 back to the upper part of tower T2 to a large extent except for any amount which is purged or replaced by make-up solvent.

The vapors leaving overhead from T4 are passed through line 30 through condenser 31 to reflux drum 32. These vapors contain isoprene, cyclopentadiene, acetone, water and relatively small quantities of hydrocarbons higher boiling than the cyclopentadiene. Some of the condensate from reflux drum 32 is returned to T4 by line 33. The remaining portion of the distillate is passed from drum 32 through line 34 to a water scrubbing tower T6. Water is injected into the upper part of T6 from line 35 to dissolve and extract away from the hydrocarbons the remaining amounts of the organic solvent, which is preferably a water-soluble polar organic compound like acetone or acetonitrile and others well known in the art. The water solution of the solvent is withdrawn from T6 through bottom line 36.

The scrubbed hydrocarbon liquid is passed from T6 through line 37 by pump 38 through a heat exchanger 39 into the soaking drum 7. In the heat exchanger the hydrocarbon stream is heated to a suitable cyclopentadiene dimerizing temperature, e.g. in the range of 150° to 300° F. under pressure for a suitable length of time to cause selective dimerization of the cyclopentadiene. Suitable temperature and residence periods in the soaker 7 are 210° F. and 25 hours. One or more soaking vessels may be used.

The product from the soaker 7 is passed through line 40 into the product fractionator T8 which is equipped with plates and heat input means for distilling the isoprene overhead. The overhead isoprene stream is passed through line 41, through condenser 42 into reflux drum 43. A portion of the distillate is refluxed through line 44 to the upper part of T8 and a remaining portion of the distillate is passed as product by line 45 to the storage tank 46. The undistilled residual bottoms is withdrawn from T8 through line 47, a portion of the bottoms being passed through the reboiler 48.

The purified isoprene specifications are:

Greater than 92% by weight isoprene.
Less than 1% by weight cyclopentadiene.

These specifications are important because the impurities have adverse effects in the major uses of isoprene, as for example in making synthetic butyl rubber.

Prior to the present invention it was considered necessary to restrict the amount of cyclopentadiene in the feed to the primary fractionator T1 to very low amounts, e.g. substantially below 1.5 weight percent and preferably no greater than about 1%, also, to control the fractionation in T1 more stringently, e.g. by higher reflux ratio and lower temperatures to keep the isoprene content in the overhead of T1 less than about 0.8 weight percent and preferably from 0.4 to 0.6 weight percent since the separation of the cyclopentadiene from the isoprene in the following steps was difficult to make in trying to meet the specification requirements. Contrasted thereto, in using the present invention the isoprene content in the feed to T1 can be substantially higher, e.g. above 1.5 weight percent up to 3 weight percent, the capacity of T1 can be increased with use of lower reflux ratio and higher temperatures to permit the overhead from T1 to contain above 1.0 weight percent up to 3 weight percent in making specification grade isoprene at greatly increased yields using a fractionator of the same size as used previously and with the aid of the cyclopentadiene dimerizing soaking zone on the feed to the product fractionator T8.

The manner in which improved yields of the purified isoprene are obtained will be described in more detail with reference to the following example.

EXAMPLE

A representative feed to the primary fractionator T1 for the operation of the present invention is a debutanized steam cracked hydrocarbon fraction having the following composition.

Table 1

FEED COMPOSITION TO PRIMARY FRACTIONATOR T1

| Components | Weight Percent |
| --- | --- |
| $C_4$ (Butanes, Butenes) | 2.6 |
| 3-methyl Butene-1 | 1.9 |
| Isopentane | 1.0 |
| 1,4-Pentadiene | 0.7 |
| 1-Pentene | 8.1 |
| 2-methyl Butene-1 | 5.2 |
| Isoprene | 6.8 |
| n-Pentane | 0.6 |
| Pentene-2 | 5.0 |
| Trimethyl ethylene | 3.2 |
| Cyclopentadiene | 1.9 |
| Piperylenes | 6.3 |
| Cyclopentene | 2.6 |
| Cyclopentane | 0.4 |
| Other $C_5$'s | 0.3 |
| Cyclohexane | 21.4 |
| Benzene | 13.0 |
| $C_7$'s | 15.0 |
| Toluene | 2.0 |
| $C_8$'s | 2.0 |
| Total | 100.0 |

This feed is fed to an intermediate part of the primary fractionator T1 having 50 bubble cap plates. The fractionator T1 is operated with a pressure of 39 pounds per square inch gauge (p.s.i.g.), 32 p.s.i.g. at the 35th plate from the bottom and 29 p.s.i.g. at the top, the feed temperature is 155° F., the temperature of the overhead vapors 151° F., and the temperature of the bottom product 225° F. The relative material flow rates are: 30,000 pounds per hour feed, 39,500 pounds per hour reflux, 7,500 pounds per hour overhead product withdrawn, and 22,500 pounds per hour bottoms product. Thus, the reflux ratio (reflux to product withdrawn) is close to 5.3 while withdrawing close to 25% of the feed as distillate product. The overhead distillate product withdrawn from the primary fractionator T1 has a composition shown in the following table.

Table 2

OVERHEAD PRODUCT OF T1

| Components | Weight Percent |
| --- | --- |
| $C_4$ (Butanes, Butenes) | 10.4 |
| Pentane, Pentenes and Pentadiene Lower Boiling than Isoprene | 30.0 |
| Isoprene | 21.0 |
| n-Pentane | 2.0 |
| Pentenes-2 | 19.0 |
| Cyclopentadiene | 1.5 |
| Piperylenes | 1.7 |
| Other $C_5$'s | 14.4 |
| Total | 100.0 |

The overhead product from T1 is subjected to extractive distillation with a solvent that preferentially extracts the diolefins in that it decreases their relative volatility. In general, the extractive distillation is employed with any of the known suitable solvents. Using aqueous acetone containing 8 weight percent of water and 92 weight percent of acetone, the extractive distillation tower is operated at pressures close to 40 p.s.i.g. The raffinate vapors containing principally mono-olefins with solvent vapor leave the top of T2 at a temperature of 140 to 142° F. under 40 p.s.i.g. pressure. The amount of solvent maintained in the fractionation zone is in the ratio of 2 volumes per volume of hydrocarbon in liquid phase. The temperature increases toward the bottom of T2 and then down toward the bottom of T3. The vapor phase side-stream which is withdrawn from T3 through line 27 is at a temperature of 190° F. In T4 a mixture of isoprene, cyclopentadiene, acetone, water and small amounts of other hydrocarbons are distilled to leave a higher boiling aqueous bottoms.

Distillate from T4 is washed with water in T6 to remove acetone under pressure and sufficiently low temperature to prevent vaporization of the hydrocarbons. A ratio of about 1 volume of water to 1 volume of distillate is used. The water-washed hydrocarbon mixture then contains with the isoprene relatively small amounts of cyclopentadiene, piperylenes, mono-olefins with some higher-boiling polymeric hydrocarbons and any other water-insoluble materials. The isoprene is at this point too impure for its usual uses and has to be further purified by fractionation. Insofar as the isoprene concentrate at this point contains more than 1 weight percent cyclopentadiene, it requires further purification. Advantageously, the isoprene concentrate is heated and maintained at a temperature of 210° C. or within the range of 180° to 240° F. under pressure for a period of 25 hours or in the range of 1 to 30 hours to effect dimerization of the cyclopentadiene after which the concentrate containing the dimerized cyclopentadiene is subjected to fractional distillation as in T8.

The product fractionator T8 containing about 50 plates is operated at 25 p.s.i.g. pressure to distill overhead the final isoprene product, the isoprene vapors being taken overhead from T8 at a temperature of 149° F., then being analyzed to see that this product meets the specification requirements. With the bottoms temperature of T8 maintained close to 175° F., or within a limited range of 165° to 180° F., no significant amount of recracking of the dimer occurs in T8.

Operating with controlled variations in the fractionation steps, records were kept of the rates of production of the isoprene product with respect to the cyclopentadiene content of the isoprene going through the fractionating system. The consequential discovery made was that by increasing the cyclopentadiene content of the isoprene fractions processed in the series of fractionators, the production rate of isoprene was greatly increased but the final isoprene product did not meet specification requirements on cyclopentadiene. This relationship is brought out by the data in the following table.

Table 3

CYCLOPENTADIENE CONTENT OF ISOPRENE FROM THE PRODUCT FRACTIONATOR IN RELATION TO PRODUCTION RATE

| Cyclopentadiene Content of Isoprene (Weight Percent) | Rate of Production of Specification Grade Isoprene (Tons Per Day) |
| --- | --- |
| 0.6 | 4 |
| 0.8 | 8 |
| 1.2 | 14 |
| 1.5 | 16 |

Separation of isoprene from cyclopentadiene monomer in the concentrate was found very difficult in the product fractionator. As shown in Table 3, to obtain a slight decrease in the cyclopentadiene content of the isoprene product, a drastic decrease in the production rate of the unit is required. By using the second soaking drum for dimerizing cyclopentadiene in the concentrate ahead of the product fractionator, the difficulties of operation are alleviated throughout the unit. For example, without this dimerizing step, the cyclopentadiene monomer content of the concentrate has to be low, e.g., below 4 weight percent, without drastically curtailing throughput in making specification isoprene product. To arrive at this low cyclopentadiene content, the initial soaking and operation of the primary fractionator has to be slowed down and allow substantially less cyclopentadiene to remain with the isoprene feed to the extractive distillation, e.g., less than 1 weight percent.

With the improvement by the present invention, the cyclopentadiene monomer content of the isoprene-rich fraction from the primary fractionator can be raised to above 1 weight percent so that the isoprene concentrate from the extractive distillation contains above 4 weight percent before the dimerizing in the second soaker ahead of the product fractionator. Under the conditions of operating the product fractionator with increased throughput, the dimerized cyclopentadiene is continuously withdrawn as bottoms with sufficient rapidity to prevent the isoprene product from having excessive cyclopentadiene for meeting specification requirements, such as a maximum of 1.0 weight percent or even 0.5 weight percent of cyclopentadiene. The final product will contain at least 92 weight percent or better than 95 weight percent isoprene.

Having described the invention, it is claimed as follows:

A process for separating purified isoprene from a steam-cracked fraction containing mono-olefins and diolefins in the $C_4$ to $C_9$ range, including isoprene and cyclopentadiene, which comprises heat soaking said fraction to dimerize a substantial amount of the cyclopentadiene, selectively distilling an isoprene-rich fraction including 1.5 to 3 weight percent of cyclopentadiene from the heat-soaked fraction, separating from the isoprene-rich fraction mono-olefins and paraffins by extractive distillation with a solvent that forms an extract of the isoprene and cyclopentadiene, separating an isoprene concentrate containing 4 to 10 weight percent of cyclopentadiene from the solvent, heat soaking said concentrate in a second soaking zone to dimerize cyclopentadiene therein, then distilling the isoprene from the heat-soaked concentrate.

References Cited in the file of this patent

UNITED STATES PATENTS

| 2,339,560 | De Simo et al. | Jan. 18, 1944 |
| 2,397,580 | Ward | Apr. 2, 1946 |
| 2,461,346 | Patterson | Feb. 8, 1949 |
| 2,704,778 | Maisel | Mar. 22, 1955 |

FOREIGN PATENTS

| 663,751 | Great Britain | Dec. 27, 1951 |